(12) United States Patent
Vromans et al.

(10) Patent No.: US 6,170,172 B1
(45) Date of Patent: Jan. 9, 2001

(54) DEVICE AND METHOD FOR CURING AN ADHESIVE BETWEEN TWO LAYERS OF AN INFORMATION CARRIER

(75) Inventors: Petrus H. G. M. Vromans; Remberto L. T. Martis; Paulus W. J. Brugel, all of Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/533,384

(22) Filed: Mar. 22, 2000

Related U.S. Application Data

(63) Continuation of application No. 09/083,695, filed on May 21, 1998, now Pat. No. 6,108,933.

(30) Foreign Application Priority Data

May 27, 1997 (EP) .................................................. 97201601

(51) Int. Cl.[7] .................................................... F26B 3/00
(52) U.S. Cl. ................................ 34/443; 34/448; 34/267; 34/274; 34/276
(58) Field of Search ............................. 34/273, 274, 420, 34/443, 448, 60, 276, 267; 428/64.1, 64.2, 64.3, 65.2; 156/272.2, 275.7, 379.6

(56) References Cited

U.S. PATENT DOCUMENTS

| | | | |
|---|---|---|---|
| 4,790,893 | * 12/1988 | Watkins | 156/232 |
| 4,968,371 | * 11/1990 | Watkins | 156/232 |
| 5,655,312 | * 8/1997 | Sevcik | 34/275 |
| 5,779,855 | * 7/1998 | Amo et al. | 156/379.6 |
| 5,785,793 | * 7/1998 | Arai et al. | 156/272.2 |
| 5,985,400 | * 11/1999 | Hennessey | 428/64.1 |
| 6,033,752 | * 3/2000 | Suzuki et al. | 428/64.1 |
| 6,083,597 | * 7/2000 | Kondo | 428/64.1 |
| 6,103,331 | * 8/2000 | Kanno | 428/64.1 |

* cited by examiner

Primary Examiner—Pamela Wilson
(74) Attorney, Agent, or Firm—Michael E. Belk

(57) ABSTRACT

A device and method cures an adhesive by means of UV radiation in an inert-gas atmosphere. The adhesive is interposed as an adhesive layer between two superposed layers of a disc-shaped optical information carrier. The device includes a UV source, a supply for an inert gas, and a holder for holding the information carrier in a centered position with respect to a centering axis. The inert-gas supply has discharge openings for inert gas, situated in a circular zone around the centering axis, at a distance from the centering axis which substantially corresponds to the radius of the peripheral edge of the information carrier, so that inert gas flows past the peripheral edge during curing. As a result locally present oxygen which would interfere with curing is expelled.

22 Claims, 4 Drawing Sheets

DEVICE AND METHOD FOR CURING AN ADHESIVE BETWEEN TWO LAYERS OF AN INFORMATION CARRIER

CROSS REFERENCE TO RELATED APPLICATIONS

This is a continuation of application Ser. No. 09/083,695, filed May 21, 1998, now U.S. Pat. No. 6,108,933, filed Aug. 29, 2000.

FIELD OF THE INVENTION

The invention is related to the field of adhesive assembly of multi-layer optical information carriers, and specifically DVD disks.

BACKGROUND OF THE INVENTION

The invention relates to a device for curing an adhesive by means of radiation in an at least substantially oxygen-free atmosphere. The adhesive is interposed as an adhesive layer between two superposed layers of a disc-shaped information carrier. The layers together define a peripheral edge of the information carrier. The device includes a radiation source and a supply for a gas, not being oxygen.

Such a device is known and is used in the production of optical information carriers of a type having two substrates glued to one another, at least one of the substrates carrying an information layer. During production a UV-curing polymerizable adhesive is applied, after which the assembly thus formed is irradiated by means of a UV irradiation device in a nitrogen atmosphere. The adhesive then cures by polymerization reactions in which radicals are formed.

DE-A 3642961 refers to the use of UV-curing adhesives as alternatives for epoxy-resin adhesives.

The above citation is hereby incorporated in whole by reference.

SUMMARY OF THE INVENTION

The inventors recognize that a method in which adhesives are cured in a nitrogen atmosphere is not considered to be a suitable mass-production method for optical information carriers because of the intricate equipment that is required.

It is an object of the invention to provide a device of the type defined in the opening paragraph, enabling adhesive layers to be cured during the large-scale production of information carriers.

To this end, the device in accordance with the invention is has a holder for holding the information carrier in a centered position with respect to a centering axis. A gas supply has discharge openings for a gas, not being oxygen, which discharge openings are situated in a circular zone around the centering axis, at a distance from the centering axis which at least substantially corresponds to the radius of the peripheral edge of the information carrier, so as to cause a gas, not being oxygen, to flow past the peripheral edge during curing. Preferably, the discharge openings for inert gas are situated in a wall portion of the device.

It will be evident that the information carrier is stationary while the device in accordance with the invention is used, i.e. while the adhesive layer is being cured.

At least one of the layers to be attached to one another by means of the adhesive, is transparent to the radiation used. In the present context, the term "layer" is to be understood to also a substrate. In principle, the adhesive can be adhesives such as photo-polymerizable acrylates.

In the device in accordance with the invention, an at least substantially oxygen-free atmosphere is created locally, specifically at the peripheral edge of the information carrier, in order to preclude that radicals formed at the periphery during curing are destroyed by reaction with oxygen from the air. It has been found, that in this way, curing of the entire adhesive layer is possible at a comparatively low irradiation intensity. Another advantage, of supplying the gas for the expulsion of the oxygen only at the periphery, is that the supplied gas is used efficiently, as a result of which, the required amount of gas is comparatively small. A suitable gas is preferably an inert gas. Preference is then given to nitrogen but gases such as argon, helium or neon are also suitable. Preferably, the radiation source is a UV source when conventional adhesives are used.

The device in accordance with the invention, can be used successfully in the manufacture of optical discs in accordance with the recently defined DVD standard. Such discs comprise include two substrates connected to one another by means of an adhesive layer, at least one of the substrates being provided with an information layer. In certain versions the adhesive layer should have a specified thickness and should be transparent.

A practical embodiment of the device in accordance with the invention includes a curing chamber having a wall formed with discharge openings. The chamber contains the holder at least during curing and the chamber has discharge openings for gas. For a gas flow directed towards the peripheral edge, the discharge openings are preferably situated opposite the holder, viewed along the centering axis.

In order to guarantee a uniform flow around the information carrier during curing, in the device in accordance with the invention, the holding apparatus form part of a turntable for supporting the information carrier, which turntable comprises a centering means and is rotatable about the centering axis at least during curing. These features further assure a uniform irradiation of the information carrier.

An optimization of the local flow around the information carrier during curing is achieved by means of an embodiment in which the discharge openings are situated in a wall portion of the device. The wall portion extends opposite the holder and has a groove which surrounds the centering axis. The groove contains a plurality of the discharge openings. The presence of the groove, particularly in conjunction with a turntable which is rotated during curing, ensures that a highly oxygen-free gas atmosphere is formed, the peripheral edge being constantly disposed in the supplied gas.

An optimization, of the irradiation of the information carrier during curing, is achieved with an embodiment of the invention having a reflecting wall portion, which extends around the centering axis at a distance from the centering axis greater than the radius of the peripheral edge of the information carrier, so as to aim radiation at the peripheral edge by reflection during curing. These features lead to a reduction of the required power of the radiation source.

An embodiment of the device in accordance with the invention, which enables an information carrier to be loaded into and removed from the curing chamber in a simple manner, a transport unit for moving the holding appartus into and out of the curing chamber.

In an embodiment of the device in accordance with the invention, which is very suitable for mass production, the holder forms part of a collection of holders which can be positioned successively with respect to the discharge openings.

The invention further relates to a method of manufacturing a disc-shaped information carrier having two superposed layers between which an adhesive layer extends. In this connection the invention aims at providing a method which enables an adhesive layer to be cured during the manufacture of an information carrier in mass-production quantities.

The method in accordance with the invention uses the device in accordance with the invention.

The invention moreover relates to a further method of manufacturing a disc-shaped information carrier having two superposed layers between which an adhesive layer extends. In this connection the invention aims at providing a method which enables a highly homogeneous adhesive layer to be formed.

To this end, in the further method in accordance with the invention, an adhesive is applied to one of the layers in two phases, a face of the respective layer being wholly covered with an adhesive during a first phase. After the first phase annular zone of adhesive is formed during a second phase, upon which both layers are moved opposite one another and towards one another and are subsequently pressed onto one another, after which curing of the adhesive is effected. Surprisingly, it has been found that this method of affixing layers to one another, layers being meant to include substrates, makes it possible to form a homogeneous adhesive layer free of gas bubbles. The adhesive is preferably cured by means of the afore-mentioned device in accordance with the invention but the present method is not limited thereto.

During the manufacture of certain information carriers, particularly optical information carriers, such as certain types of DVDs, it is necessary to form a uniform adhesive layer of a well-defined layer thickness, without any gas inclusions, which are generally air inclusions, being formed. In order to obtain an adhesive layer without gas inclusions, it has proved to be favorable, to feed an ionized gas stream, for example, an ionized air stream, past the applied adhesive after completion of the first phase, during which first phase one of the layers is actually wetted with the adhesive, but prior to the beginning of the second phase. Satisfactory results have been achieved with a gas stream having negative ions. Upon completion of the second phase the layers are brought into contact with one another as rapidly as possible. It has been found that, just before actual contact is established, the adhesive present in the zone slightly spreads over the wetted layer owing to a potential difference which prevails between the annular zone of adhesive and the other layer, which has not been provided with adhesive. After contact has been made and during the subsequent pressing-down, the adhesive spreads over the entire area of the layers without any gas inclusions being formed. In this respect, it has proved to be important that, after a first contact has been made, the layers are moved slowly towards one another to allow the adhesive to spread over the whole area of the layers. An important further aspect is that, upon completion of the second phase the layers extend parallel to one another as they come into contact with one another and are pressed onto one another. In the case of non-flat layers, it may be favorable, to give one or both layers a slightly curved shape, particularly a convex shape.

In order to obtain an adhesive layer having a well-defined layer thickness, it has proved to be advantageous, to provide one or both layers, prior to the adhesion process, with an annular recess for receiving excess adhesive. The recess is preferably an annular recess adjoining the usually present central hole of the information carrier. Such a recess, as well as any excess adhesive, is situated outside the information area of the information carrier thus manufactured and is therefore not a hindrance. Moreover, using this measure has the advantage that, the layers adhere to one another over their whole areas, which has a favorable effect on, the mechanical stability of the information carrier thus manufactured.

If the layers are spun prior to being pressed together, it is recommended to provide one or both layers with an annular projection adjoining the annular recess. Such a projection gives rise to a capillary action on the adhesive, thereby precluding the outflow of adhesive from the recess during spinning.

The invention also relates to an information carrier produced by the method of the invention describe above. The information carrier includes two layers between which an adhesive layer extends and having a center hole, at a side which faces the adhesive layer at least one of the layers has an annular recess adjoining the center hole. Preferably, at least one of the layers has an annular projection adjoining the annular recess.

The invention will now be described in more detail, by way of example, with reference to the drawings, in which,

DETAILED DESCRIPTION OF THE PREFERRED EMBODIMENT

Figure 1:
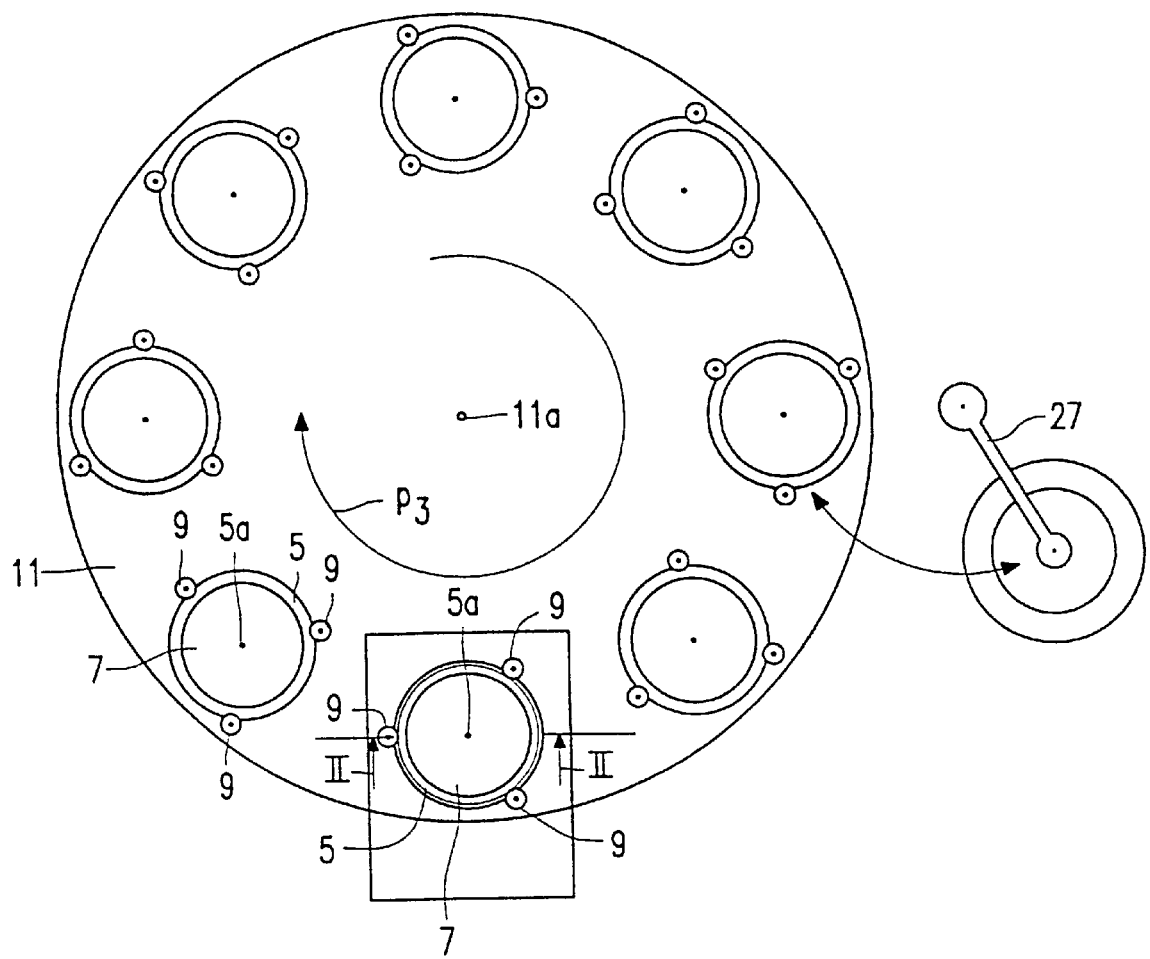
FIG. 1 is a diagrammatic plan view showing an embodiment of the device in accordance with the invention.
Figure 2:
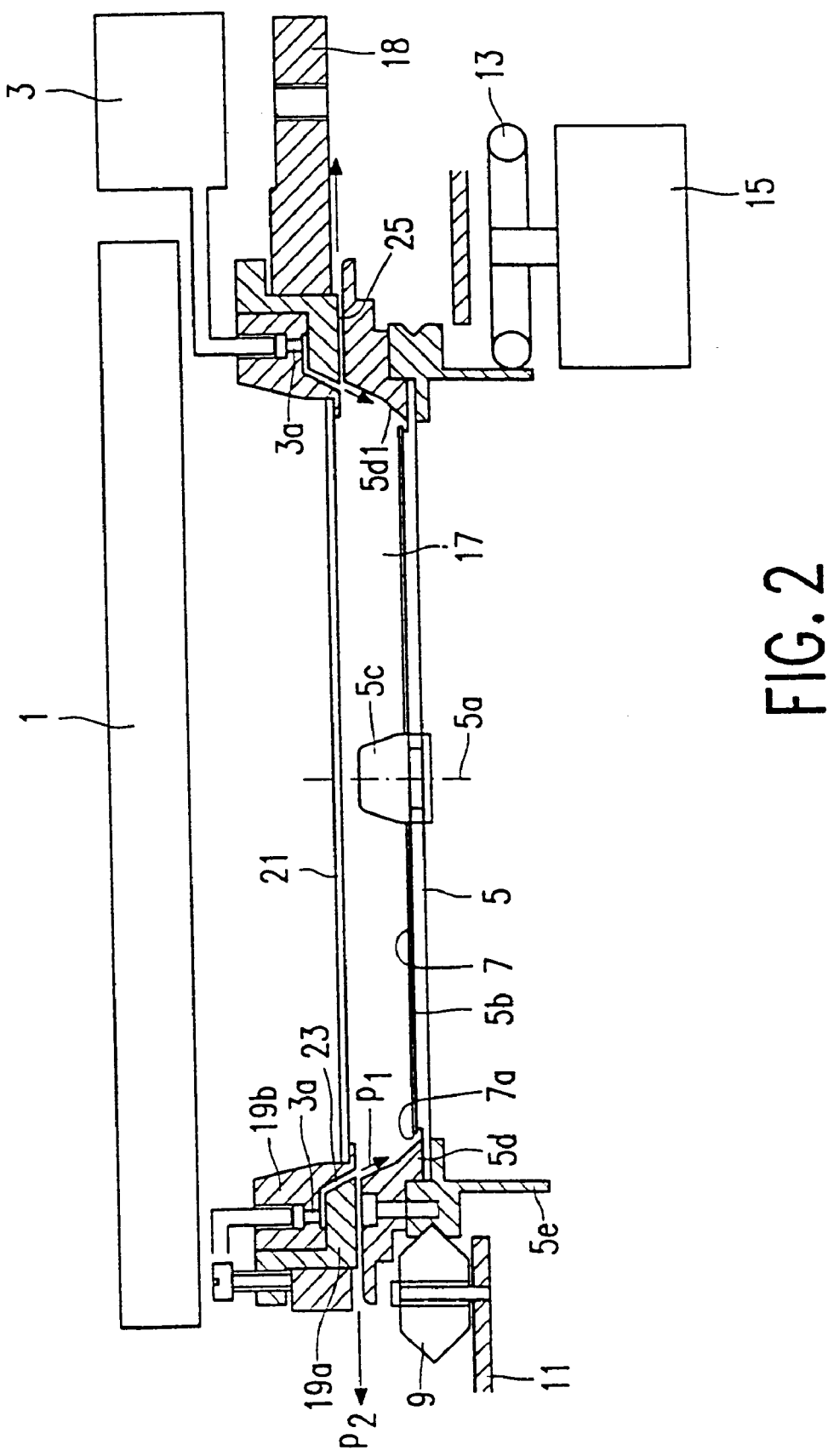
FIG. 2 is a sectional view taken on the line II–II in FIG. 1, FIGS. 3A–3D illustrate diagrammatically a number of steps of an example of the further method in accordance with the invention.

The embodiment of the device in accordance with the invention, shown in FIGS. 1 and 2 is intended for curing an adhesive by means of UV radiation in a nitrogen atmosphere. The adhesive is in particular a photopolymerizable acrylate present between two substrates of an optical information carrier to be formed, particularly a DVD. The device includes a radiation source 1 in the form of a radiation unit with UV lamps, a supply device for nitrogen, and a holder which forms part of a turntable 5, for holding an information carrier 7 being formed. The information carrier has a peripheral edge 7a. By means of three bearing rollers 9, the turntable 5 is supported in a frame, which in the present example, forms part of a rotatable platform 11. The turntable 5 is rotatable relative to the platform 11 about an axis of rotation 5a. The turntable 5 includes a holding apparatus comprised of a carrying surface 5b and a centering mandrel 5c, respectively for supporting and centering the information carrier 7, the axis of rotation 5a defining a centering axis for the information carrier 7. The turntable 5 further has a wall portion 5d, which extends around the axis of rotation 5a, at a distance from this axis slightly larger than the radius of the peripheral edge 7a of the information carrier 7. The wall portion 5d has one or more reflective surfaces 5d1 for aiming UV rays at the adhesive situated near the peripheral edge 7a during irradiation. The turntable 5 further includes a circularly cylindrical drivable portion 5e adapted to cooperate with a drive wheel 13 of an electrical drive 15.

A stationary device part 18 is disposed opposite the turntable 5 and has wall portions 19a and 19b as well as a transparent plate, in the present example, a glass plate 21, supported by the wall portion 19b. The turntable 5, the wall portions 19a and 19b, and the transparent plate 21 together form a curing chamber 17. If desired, for example, in the case of two-sided irradiation, a part of the turntable, particularly the part underneath the carrying surface 5b, can be made of a transparent material. The nitrogen supply device has discharge openings 3a arranged in a circular zone around the centering axis 5a. In the present example, the number of discharge openings 3a is eight, the discharge openings being equispaced in a groove 23 which surrounds the centering axis 5a and is situated opposite the turntable 5. The groove 23, which is basically slit-shaped, terminates in the curing chamber 17, nitrogen gas flowing into the curing chamber 7 as indicated by the arrows P1 during the curing process. In order to allow the air present in the curing chamber 7 to be discharged, a slit-shaped discharge opening 25 is formed between the turntable 5 and the wall 19a, via which opening gas, i.e. air and possibly nitrogen, can be discharged as indicated by an arrow P2.

The afore-mentioned rotatable platform 11, which is rotatable about an axis of rotation 11a, forms part of a transport device, and in the present example it has eight turntables 5, thereby forming a collection of holding apparatus which are successively movable to a position opposite the stationary device part 18 by rotation of the platform as indicated by an arrow P3. To load information carriers 7 onto and remove them from the platform 11, the device in the present example includes a loading mechanism having a pivotable gripper 27.

Figure 3A:
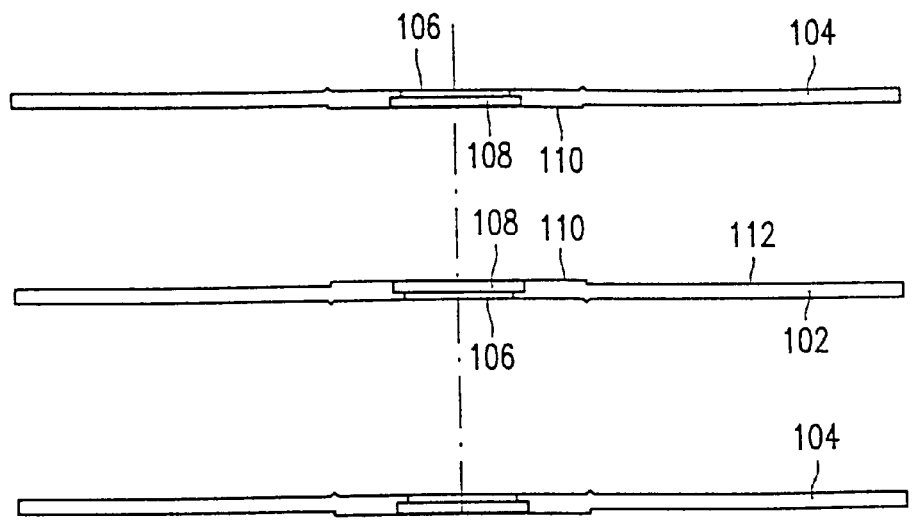
Figure 3B:
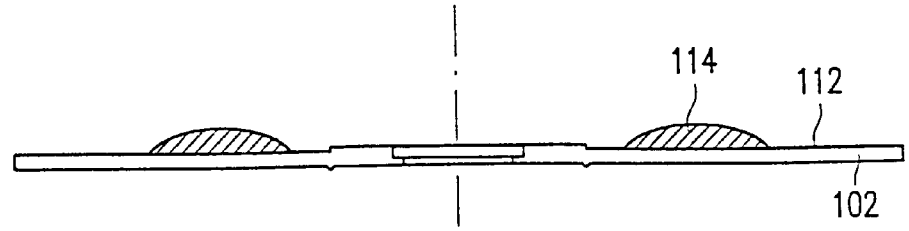
Figure 3C:
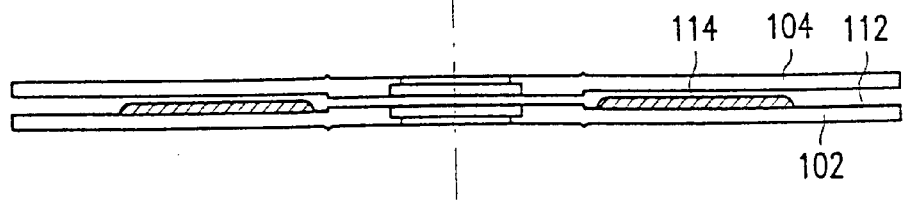
Figure 3D:
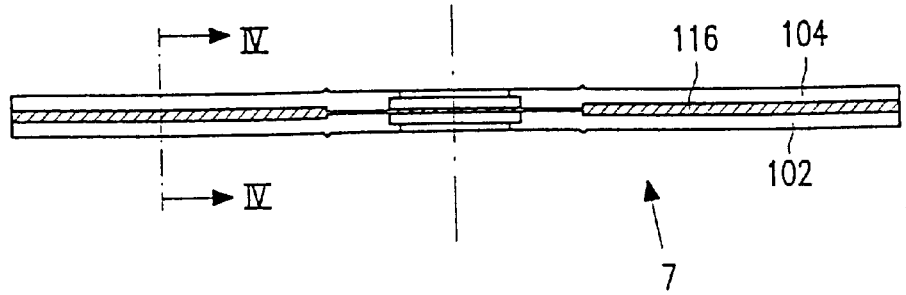

An example of the further method in accordance with the invention will be described in more detail with reference to FIGS. 3A through 3D. This method is a method of manufacturing a disc-shaped information carrier, starting from two substrates 102 and 104. Hereinafter, these substrates, which are both transparent in the present example, are also referred to as the layer 102 and the layer 104, respectively. In this example, each of the layers 102 and 104 has a center hole 106, an annular recess 108 adjoining the center hole 106, and an annular projection 110 adjoining the recess 108. In a first phase of the method in accordance with the invention, an adhesive is applied to the layer 102 and is spread over the entire layer surface of the layer 102 by spinning, so as to form a thin layer 112 of adhesive. An air stream carrying negative ions is passed over this layer 112, after which adhesive, particularly a polymerizable acrylate, is deposited onto the negatively charged thin layer 112 as a closed annular zone 114. Immediately after this, the layers 102 and 104 are moved towards one another, the approach speed just before contact is made being so low as to allow the adhesive in the zone to flow out under the influence of potential differences prevailing between the adhesive in the zone 114 and the layer 104 (FIG. 3C). Subsequently, the layers 102 and 104 are pressed onto one another, the adhesive spreading over the whole layers 102 and 104 to form an adhesive layer 116 of a well-defined thickness, for example 55 microns. Any excess adhesive is accommodated in the recesses 108. The resulting adhesive layer 116 of the information carrier thus being formed, which as in the preceding Figures bears the reference numeral 7, can be cured in the device in accordance with the invention.

Figure 4A:
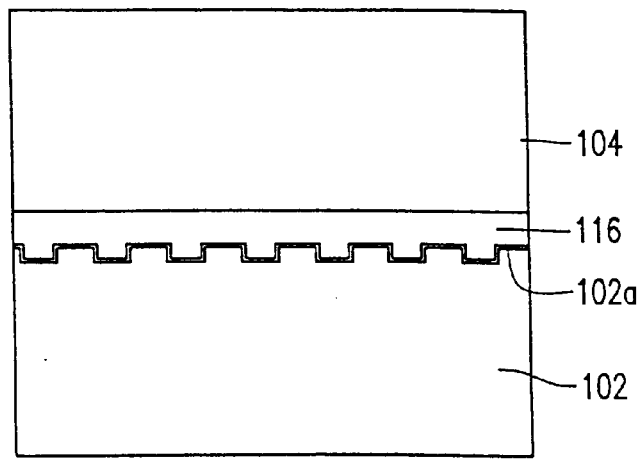
FIGS. 4A–4C are sectional views taken on the line IV—IV in FIG. 3D, showing segments of embodiments of the information carrier in accordance with the invention.
Figure 4B:
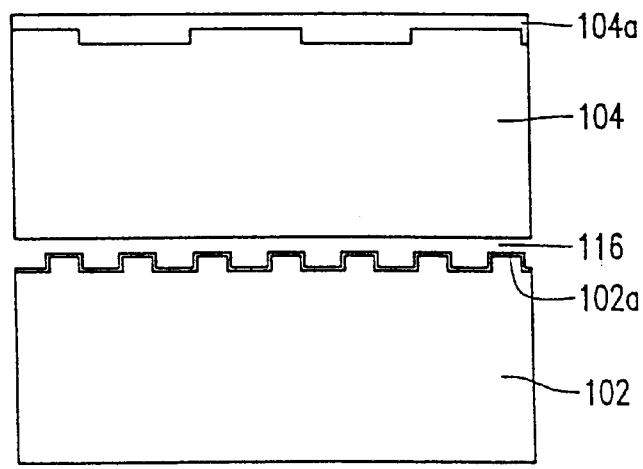
Figure 4C:
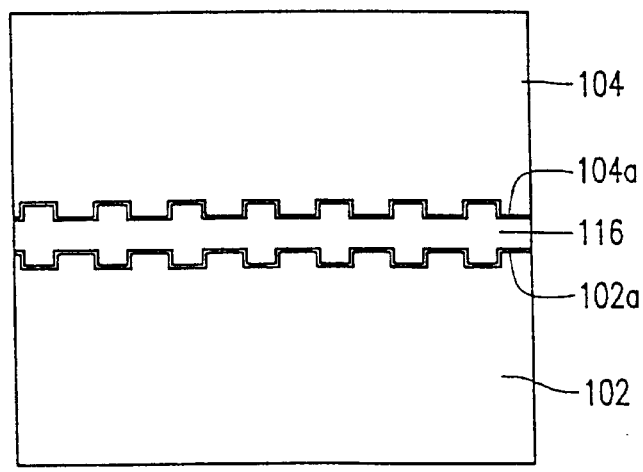

FIGS. 4A through 4C show segments of possible embodiments of the information carrier in accordance with the invention. FIG. 4A shows diagrammatically a DVD single-layer version, of which at least the substrate 102 is transparent. The substrate 112 carries an information layer 102a, which is at least substantially wholly reflecting for a radiation beam which is incident via the substrate 102. The adhesive layer 116 is situated between the substrate 102 carrying the information layer 102a, on the one side, and the substrate 104, on the other side. FIG. 4B shows a forward compatible DVD version. Both substrates 102 and 104 of this information carrier are transparent. The substrate 102 carries an information layer 102a, which is reflecting for a given wavelength, in the present example 650 nanometers, but transparent for another wavelength, in the present example 780 nanometers. The substrate 104 carries an information layer 104, which is reflecting for a radiation beam which is incident via the substrates 102 and 104. The adhesive layer 116 is situated between the substrate 102 carrying the information layer 102a, on the one side, and the substrate 104 carrying the information layer 104a, on the other side. The information carrier shown in FIG. 4C is a one-sided dual-play DVD. Of this information carrier, at least the substrate 102 is transparent to an incident radiation beam. The substrate 102 carries an information layer 102a, which is semi-reflective and semi-transmissive. The substrate 104 carries an information layer 104a, which is fully reflecting for a radiation beam which is incident via the substrate 102. The adhesive layer 116, interposed between the layers 102a and 104a, which in the present example, as in the preceding examples, is transparent to the radiation of the customary scanning beams.

It is to be noted that, the invention is not limited to the examples disclosed herein. For example, instead of nitrogen, any other gas which is inert to the adhesive can be used for the creation of an atmosphere which is inert to the applied adhesive. Depending on the initiators in the adhesive, the polymerization can also be produced by means of radiation other than UV radiation.

What is claimed is:

1. A device comprising:
   means for providing an assembly with an adhesive between two disc-shaped superposed layers, the layers together defining a peripheral edge;
   means for supporting the assembly in a predetermined position;
   a radiation source to provide radiation directed onto the adhesive layer for curing the adhesive when the assembly is in the predetermined position;
   gas supply means for providing a gas which increases curing with respect to air, flowing over the peripheral edge when the assembly is in the predetermined position as the radiation is directed onto the adhesive layer during curing.

2. The device of claim 1, in which the radiation source is a UV source.

3. The device of claim 1, in which the gas is a non-oxidizing gas.

4. The device of claim 3, in which the gas includes an inert gas.

5. The device of claim 4, in which the inert gas includes nitrogen.

6. The device of claim 5, in which the inert gas includes negative ions.

7. The device of claim 1, in which the supporting means includes a flat turntable for supporting the assembly, the turntable is rotatable about a central axis at least during curing, and supporting means includes a centering means for holding a central hole of the assembly at the central axis of the turntable during curing.

8. The device of claim 1, in which:
   the device further comprises a curing chamber having a wall extending around the peripheral edge of the assembly;

the gas supply means include gas discharge openings in the wall for introducing the gas into the chamber at the peripheral edge of the assembly; and an air discharge opening in the wall vents air from the chamber so that the gas flows into the chamber and over the peripheral edge during curing.

9. The device of claim 8, in which the wall includes a reflecting portion positioned to reflect radiation onto the peripheral edge during curing.

10. The device of claim 1, further comprising a transport unit for moving the supporting means into and out of the curing chamber.

11. The device of claim 1, in which the supporting means include a plurality of supporting surfaces for respective assemblies which can be positioned successively with respect to the discharge openings.

12. A method of producing a disc-shaped optical information carrier, comprising the steps of:

providing two disc-shaped layers;

applying an uncured adhesive to one of the layers;

moving the two layers together superpositioned with the adhesive spread between the layers to form an assembly;

supporting the assembly in a predetermined position;

supplying a gas which increases curing with respect to air, flowing over a periphery of the assembly; and directing radiation onto the assembly as the gas flows over the periphery, so as to cure the adhesive between the layers to produce the optical information carrier.

13. The method of claim 12, in which the radiation is directed from a UV source.

14. The method of claim 12, in which a non-oxidizing gas is supplied.

15. The method of claim 14, in which an inert gas is supplied.

16. The method of claim 15, in which nitrogen is supplied.

17. The method of claim 12, in which a gas carrying negative ions is supplied.

18. The method of claim 12, in which:

supporting the assembly includes placing the assembly on a flat turntable; and the method further comprises the step of rotating the turntable about a central axis at least during curing.

19. The method of claim 12, in which supplying the gas includes discharging the gas from openings at the peripheral edge of the assembly.

20. The method of claim 12, in which directing the radiation includes reflecting a portion of the radiation onto the peripheral edge during curing.

21. The method of claim 12, further comprising the steps of:

moving a supported assembly into a curing chamber prior to curing the assembly and moving a resulting information carrier out of the curing chamber after curing the assembly to produce the information carrier; and discharging air from the curing chamber while supplying the gas to the curing chamber at the periphery of the assembly and directing radiation onto the adhesive in the curing chamber to cure the assembly to produce the information carrier.

22. The method of claim 12, in which the supporting includes supporting a plurality of assemblies as the assemblies are positioned successively with respect to the discharge openings.

* * * * *